US006357880B2

(12) United States Patent
Epstein et al.

(10) Patent No.: US 6,357,880 B2
(45) Date of Patent: Mar. 19, 2002

(54) DISPLAY APPARATUS WITH CORROSION-RESISTANT LIGHT DIRECTING FILM

(75) Inventors: Kenneth A. Epstein, St. Paul; Robert J. Fleming, Lake Elmo; Timothy J Gardner, Inver Grove Heights; Christopher S. Lyons, St. Paul; Stephen P. Maki, North St. Paul; Mark D. Nachbor, Plymouth, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/834,164

(22) Filed: Apr. 12, 2001

Related U.S. Application Data

(62) Division of application No. 09/425,765, filed on Oct. 22, 1999, now Pat. No. 6,264,336.

(51) Int. Cl.$^7$ .................................................. G02B 5/08

(52) U.S. Cl. ...................... 359/606; 359/607; 359/608; 359/599; 359/850; 359/851; 359/852

(58) Field of Search ................................. 359/606, 607, 359/608, 599, 850, 851, 852, 497; 349/57, 62, 64, 86, 112, 113; 362/31

(56) References Cited

U.S. PATENT DOCUMENTS

| | | |
|---|---|---|
| 3,124,639 A | 3/1964 | Kahn |
| 3,610,729 A | 10/1971 | Rogers |
| 3,711,176 A | 1/1973 | Alfrey, Jr. et al. |

(List continued on next page.)

FOREIGN PATENT DOCUMENTS

| | | |
|---|---|---|
| EP | 0 843 195 A1 | 5/1998 |
| EP | 0 883 015 A1 | 12/1998 |
| JP | 1 035 4634 | 8/1999 |
| WO | WO95/17303 | 6/1995 |

(List continued on next page.)

OTHER PUBLICATIONS

Hoeji, H.K., "Design of reflectors for reflective LCDs", *Journal of the Optical Society of Korea*—Korean Edition, vol. 9, No. 6.7 pages (Dec. 1998).

Clabburn, R.J.T. et a., "Asymmetric Reflective Difusers for Hand–held Displays", Microsharp Corporation Limited, Swindon, U.K. (1999).

(List continued on next page.)

*Primary Examiner*—Mohammad Sikder
(74) *Attorney, Agent, or Firm*—Merchant & Gould P.C.

(57) ABSTRACT

The present invention is a display apparatus that provides protection against damage for a metallic layer. The display apparatus includes a light modulating layer, a polarizer, and a light directing film. The light directing film includes a prismatic structure having two sides, where one side includes saw tooth formations having tilted surfaces and a metal layer on the side of the prismatic substrate having the saw-tooth formations. A tilt angle of the tilted surfaces offsets an optimal viewing angle for the display from a glare angle for the display. In a first embodiment of the invention, the light directing film of the display apparatus further includes an inorganic protective layer formed on the metal layer, wherein the inorganic protective layer inhibits molecular transfer to the metal layer and balances the color of reflected and transmitted light. The light directing film further includes a pressure sensitive adhesive layer between a polarizer and the inorganic protective layer. Alternatively, the light directing film of the display apparatus of the present invention includes a polymer protective layer formed over the metal layer to protect the metal layer from damage. The light directing film also includes a diffuse adhesive layer formed over the polymer layer, attached to the polarizer. The polymer protective layer protects the metal layer from the adhesive layer. The display apparatus may include both the inorganic protective layer and the polymer protective layer, in one embodiment.

42 Claims, 9 Drawing Sheets

U.S. PATENT DOCUMENTS

| | | |
|---|---|---|
| 3,860,036 A | 1/1975 | Newman, Jr. |
| 4,106,859 A | 8/1978 | Doriguzzi et al. |
| 4,307,150 A | 12/1981 | Roche |
| 4,357,396 A | 11/1982 | Grunewalder et al. |
| 4,431,268 A | 2/1984 | Ohno et al. |
| 4,446,305 A | 5/1984 | Rogers et al. |
| 4,457,598 A | 7/1984 | Shimabukuro et al. |
| 4,520,189 A | 5/1985 | Rogers et al. |
| 4,521,588 A | 6/1985 | Rogers et al. |
| 4,525,413 A | 6/1985 | Rogers et al. |
| 4,547,432 A | 10/1985 | Pitts et al. |
| 4,645,714 A | 2/1987 | Roche et al. |
| 4,666,263 A | 5/1987 | Petcavich |
| 4,720,426 A | 1/1988 | Englert et al. |
| 4,726,662 A | 2/1988 | Cromack |
| 4,780,372 A | 10/1988 | Tracy et al. |
| 4,834,857 A | 5/1989 | Gillery |
| 4,873,139 A | 10/1989 | Kinosky |
| 4,902,580 A | 2/1990 | Gillery |
| 4,963,012 A | 10/1990 | Tracy et al. |
| 5,019,458 A | 5/1991 | Elgat et al. |
| 5,055,356 A | 10/1991 | Minowa et al. |
| 5,140,457 A | 8/1992 | Letter |
| 5,188,760 A | 2/1993 | Hikmet et al. |
| 5,211,878 A | 5/1993 | Reiffenrath et al. |
| 5,215,832 A | 6/1993 | Hughes et al. |
| 5,216,551 A | 6/1993 | Fujii |
| 5,235,443 A | 8/1993 | Barnik et al. |
| 5,253,105 A | 10/1993 | Paul et al. |
| 5,269,995 A | 12/1993 | Ramanathan et al. |
| 5,294,657 A | 3/1994 | Melendy et al. |
| 5,296,297 A | 3/1994 | Servais et al. |
| 5,316,703 A | 5/1994 | Schrenk |
| 5,319,478 A | 6/1994 | Fiinfschilling et al. |
| 5,325,218 A | 6/1994 | Willett et al. |
| 5,361,172 A | 11/1994 | Schissel et al. |
| 5,376,431 A | 12/1994 | Rowland |
| 5,389,324 A | 2/1995 | Lewis et al. |
| 5,448,404 A | 9/1995 | Schrenk et al. |
| 5,451,980 A * | 9/1995 | Simon et al. .................. 345/88 |
| 5,486,935 A | 1/1996 | Kalmanash |
| 5,486,949 A | 1/1996 | Schrenk et al. |
| 5,519,542 A | 5/1996 | Yano et al. |
| 5,543,227 A | 8/1996 | Hughes et al. |
| 5,572,411 A | 11/1996 | Watai et al |
| 5,583,704 A | 12/1996 | Fujii |
| 5,589,280 A | 12/1996 | Gibbons et al. |
| 5,608,550 A | 3/1997 | Epstein et al. |
| 5,612,820 A | 3/1997 | Schrenk et al. |
| 5,629,055 A | 5/1997 | Revol et al. |
| 5,686,979 A | 11/1997 | Weber et al. |
| 5,699,188 A | 12/1997 | Gilbert et al. |
| 5,721,603 A | 2/1998 | De Vaan et al. |
| 5,744,534 A | 4/1998 | Ishiharada et al. |
| 5,751,388 A | 5/1998 | Larson |
| 5,767,935 A | 6/1998 | Ueda et al. |
| 5,770,306 A | 6/1998 | Suzuki et al. |
| 5,783,120 A | 7/1998 | Ouderkirk et al. |
| 5,793,456 A | 8/1998 | Broer et al. |
| 5,808,794 A | 9/1998 | Weber et al. |
| 5,825,542 A | 10/1998 | Cobb, Jr. et al. |
| 5,825,543 A | 10/1998 | Ouderkirk et al. |
| 5,837,362 A | 11/1998 | O'Connel et al. |
| 5,841,496 A | 11/1998 | Itoh et al. |
| 6,111,697 A | 8/2000 | Merrill et al. |
| 6,166,793 A | 12/2000 | Hayashi et al. |

FOREIGN PATENT DOCUMENTS

| | | |
|---|---|---|
| WO | WO95/17691 | 6/1995 |
| WO | WO 95/17692 | 6/1995 |
| WO | WO 95/17699 | 6/1995 |
| WO | WO 95/27919 | 10/1995 |
| WO | WO 96/19347 | 6/1996 |
| WO | WO 97/01440 | 1/1997 |
| WO | WO 97/01616 | 1/1997 |
| WO | WO 97/01774 | 1/1997 |
| WO | WO 97/05521 | 2/1997 |
| WO | WO 97/32226 | 9/1997 |
| WO | WO 98/22953 | 5/1998 |
| WO | WO 98/24230 | 6/1998 |
| WO | WO 99/21913 | 5/1999 |
| WO | WO 99/28258 | 6/1999 |

OTHER PUBLICATIONS

Schrenk, W.J. et al., "Nanolayer polymeric optical films", *Tappi Journal*, pp. 169–174 (Jun. 1992).

U.S. Patent Application Docket No. 54168USA6A, "Method of Coating Microstrucred Substrates with Polymeric Layer(s), Allowing Preservation of Surface Feature Profile", 50 pages.

U.S. Patent Application Docket No. 54701USA4A, "Retroreflective Articles Having Polymer Multilayer Reflective Coatings", 30 pages.

U.S. Patent Application Docket No. 7780.453US01 "Optical Devices Using Reflecting Polarizing Materials", 59 pages.

* cited by examiner

DISPLAY APPARATUS WITH CORROSION-RESISTANT LIGHT DIRECTING FILM

This application is a division of Ser. No. 09/425,765 Oct. 22, 1999 U.S. Pat. No. 6,264,336.

FIELD OF THE INVENTION

The present invention is directed to a light directing arrangement and method for use with a display apparatus, and more particularly to a light directing arrangement that is resistant to corrosion and directs an image to an angle different from a glare angle.

BACKGROUND OF THE INVENTION

Liquid crystal displays (LCD) are used in many different types of electronic devices, including portable computers, cellular phones, and digital watches. One class of LCD, which is substantially reflective, often includes a reflector for directing ambient light to the viewer. Another class of LCD often includes a partially transmissive reflector for also allowing light from a light source within the device to convey information to the viewer. A partially transmissive reflector is commonly called a transflector, and an LCD that incorporates a transflector is commonly called transflective. The reflector may be made of metal or other types of composite materials. Some examples of LCD devices are discussed in co-pending application, "Optical Devices Using Reflecting Polarizing Materials", Ser. No. 09/298,003, filed Apr. 22, 1999.

SUMMARY OF THE INVENTION

The present invention is a display apparatus that provides protection against corrosion for a metallic layer. The display apparatus includes a light modulating layer sandwiched between two polarizers and a light directing film. The light directing film includes a prismatic structure having two sides, where one side includes saw-tooth formations having tilted surfaces, and a metal layer on the side of the prismatic substrate having the saw-tooth formations. The tilt angle of the tilted surfaces offsets an optimal viewing angle for the display from a glare angle for the display.

In a first embodiment of the invention, the light directing film of the display apparatus further includes an inorganic protective layer formed on the metal layer, wherein the inorganic protective layer inhibits molecular transfer to the metal layer and balances the color of reflected and transmitted light. The light directing film further includes a pressure sensitive adhesive layer between a polarizer and the inorganic protective layer.

The pressure sensitive adhesive layer may be an acrylate acrylic acid adhesive layer, the adhesive layer being optically diffuse, wherein the adhesive layer inhibits corrosion of the metal layer, in one embodiment of the invention. The pressure sensitive adhesive layer may include optical diffuser particles. The inorganic protective layer may be one or more materials selected from the group consisting of titanium, indium tin oxide, zinc sulfide, tin oxide, indium oxide, titanium oxide, silicon dioxide, silicon monoxide, and magnesium fluoride. The metal layer may be selected from one or more of the group consisting of silver, chromium, nickel, aluminum, titanium, aluminum-titanium alloy, gold, zirconium, platinum, palladium, aluminum-chromium alloy and rhodium. The metal layer is preferably silver. The prismatic structure may be made of cured resin, such as a UV curable cross-linked epoxy-acrylate.

The display apparatus may also include a light cavity for providing light to the light modulating layer, adjacent to the prismatic polymer substrate, wherein the metal layer is partially transmissive.

The tilted surfaces of the prismatic layer may have a tilt angle of about 1° to 35° from horizontal, more preferably about 3° to 12° from horizontal, and most preferably about 6° to 9° from horizontal, in one application. The saw-tooth formations may have a repeat distance of about 5 microns or more and about 200 microns or less, more preferably about 30 microns or more and about 80 microns or less, and most preferably about 50 microns, for one application.

In a second embodiment of the present application, a polymer protective layer is formed over the metal layer to protect the metal layer from corrosion. The light directing film also includes a diffuse adhesive layer formed over the polymer layer, attached to the polarizer. The polymer protective layer protects the metal layer from the mobile reactive species in the adhesive layer. The polymer protective layer may be selected from a group consisting of cross-linked epoxy, cross-linked or linear acrylic resin, soluble polyester, polyethylene, polyvinylidene chloride, polyvinyl alcohol and polymethyl methacrylate.

The polymer protective layer may be formed by solution coating in a preferred embodiment, in which case the thickness can range from about 0.01 micron to about 50 microns. Alternatively, the polymer protective layer may be formed by the vapor deposition and subsequent curing of a polymer precursor onto the metal layer. The protective layer may be cured using a process selected from the group of thermal radiation, ultraviolet radiation, electron beam radiation, plasma exposure and corona exposure. In the case of formation using vapor deposition, the polymer protective layer may have a thickness of about 1 nanometer to 2 micrometers.

Alternatively, the polymer protective layer may be formed by a plasma process selected from the group consisting of plasma-polymerization and plasma-enhanced chemical vapor deposition. Preferably, the polymer protective layer is a solution coated polymethyl methacrylate. Preferably, the metal layer is a silver layer having a thickness of about 400 Angstroms. The diffuse adhesive layer may preferably be butyl acrylate acrylic acid adhesive.

The display apparatus of the present invention may include both the inorganic protective layer and the polymer protective layer.

BRIEF DESCRIPTION OF THE DRAWINGS

The invention may be more completely understood by considering the detailed description of various embodiments of the invention which follows in connection with the accompanying drawings.

Figure 1:
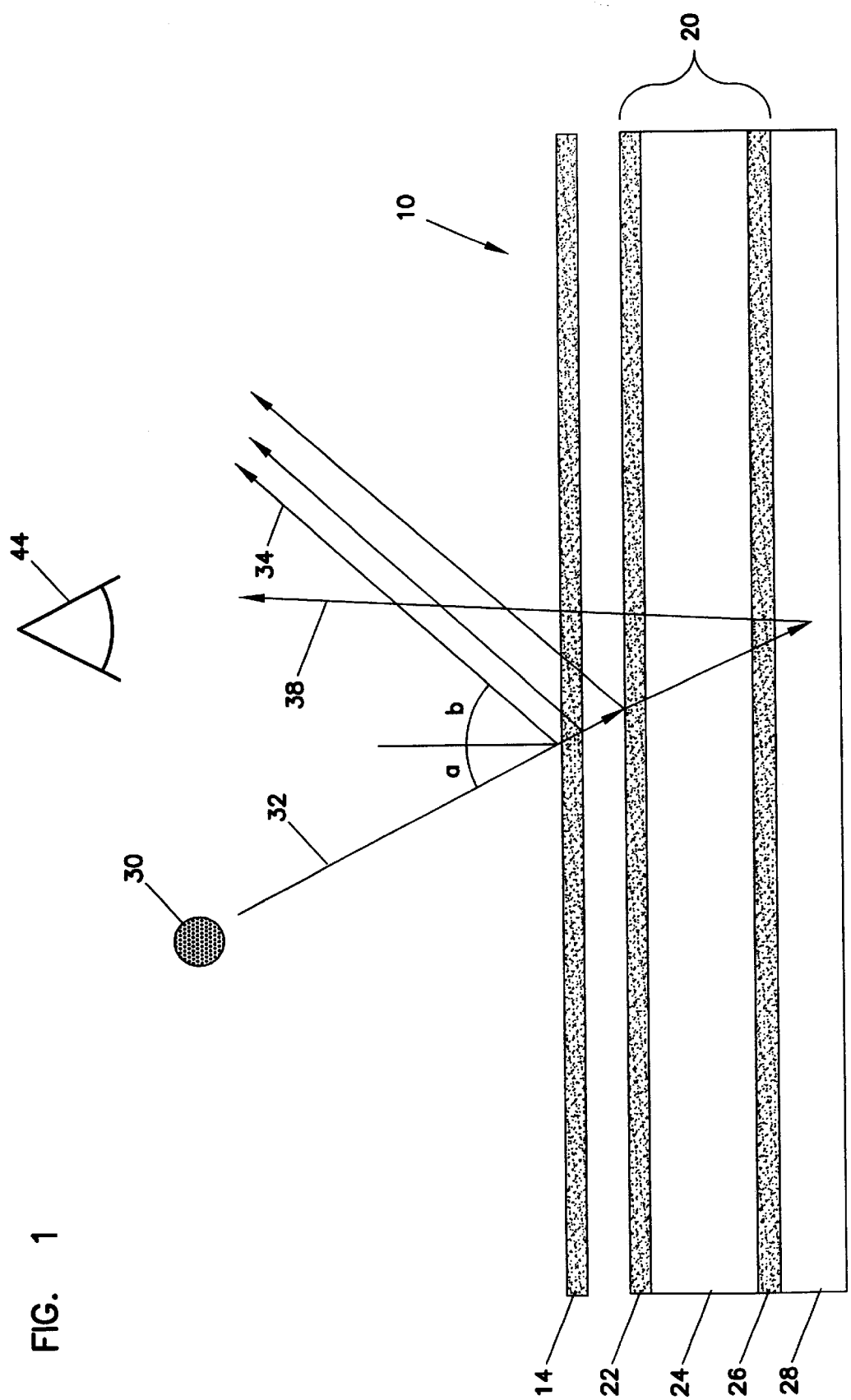
FIG. 1 is a cross-sectional view of a display apparatus of one embodiment of the present invention, including a light directing film.

While the invention is amenable to various modifications and alternative forms, specifics thereof have been shown by way of example in the drawings and will be described in detail. It should be understood, however, that the intention is not to limit the invention to particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

The present invention is believed to be applicable to a variety of systems and arrangements that direct light away from a glare angle and inhibit corrosion of a reflective or transflective metal layer in a display. The invention has been found to be particularly advantageous in application environments where a transflective display is needed, that is, a display that is capable of being illuminated by an ambient light source or by a light source within the display. While the present invention is not so limited, an appreciation of the various aspects of the invention is best gained through a discussion of the various application examples operating in such an environment.

FIG. 1 illustrates a cross-section of one particular embodiment of a display 10 of the present invention including a lens or touch screen 14. The lens or touch screen 14 may receive input from the user of the display, or may contribute specific optical qualities to the display. The display firther includes a light modulating layer 20, made up of a top polarizer 22, a liquid crystal layer 24, and a bottom polarizer 26. Further, a light directing film 28 is attached to the bottom polarizer 26. The light directing film of the present invention may also be incorporated into a display device that includes only one polarizer, although it will more commonly be used in a device having two polarizers that sandwich the liquid crystal layer. The light directing film 28 is provided to steer the image toward a desired viewing angle, which is substantially different than a glare angle of the display 10. The structure of the light directing film 28 is discussed in detail below. The light directing film 28 may also be referred to as a beam steering film or tilted mirror film.

In FIG. 1, an ambient light source 30 is illustrated, producing incoming ambient light rays 32. In this illustration, a light ray 32 from source 30 is incident on the display apparatus at angle a from the normal. The normal is the direction perpendicular to the display surface. A portion of the incoming light will be reflected as glare, illustrated by glare ray 34, by the top surface of the display apparatus 10. The glare ray 34 has a glare angle, b, from the normal. The glare image will be visible over a range of viewing angles, but will have a peak brightness at glare angle b. Angle a is equal to angle b, according to the law of reflection. Another portion of the incoming light will pass through the light modulating layer 20 and be reflected by the light directing film 28, as the display information or image, represented by image ray 38. The light directing film 28 is designed to direct the image ray 38 so that it will emerge from the display 10 at an angle from the normal that is substantially different than the glare angle b. The display image will also be visible over a range of viewing angles, and will have a peak brightness at a narrower range of viewing angles, centered around an "optimal viewing angle." In FIG. 1, the peak image angle or optimal viewing angle is nearly normal to the display, as represented by image ray 38. As a result, a viewer of the display apparatus 10 at position 44 can view the display image clearly without interference from the glare image.

Figure 2:
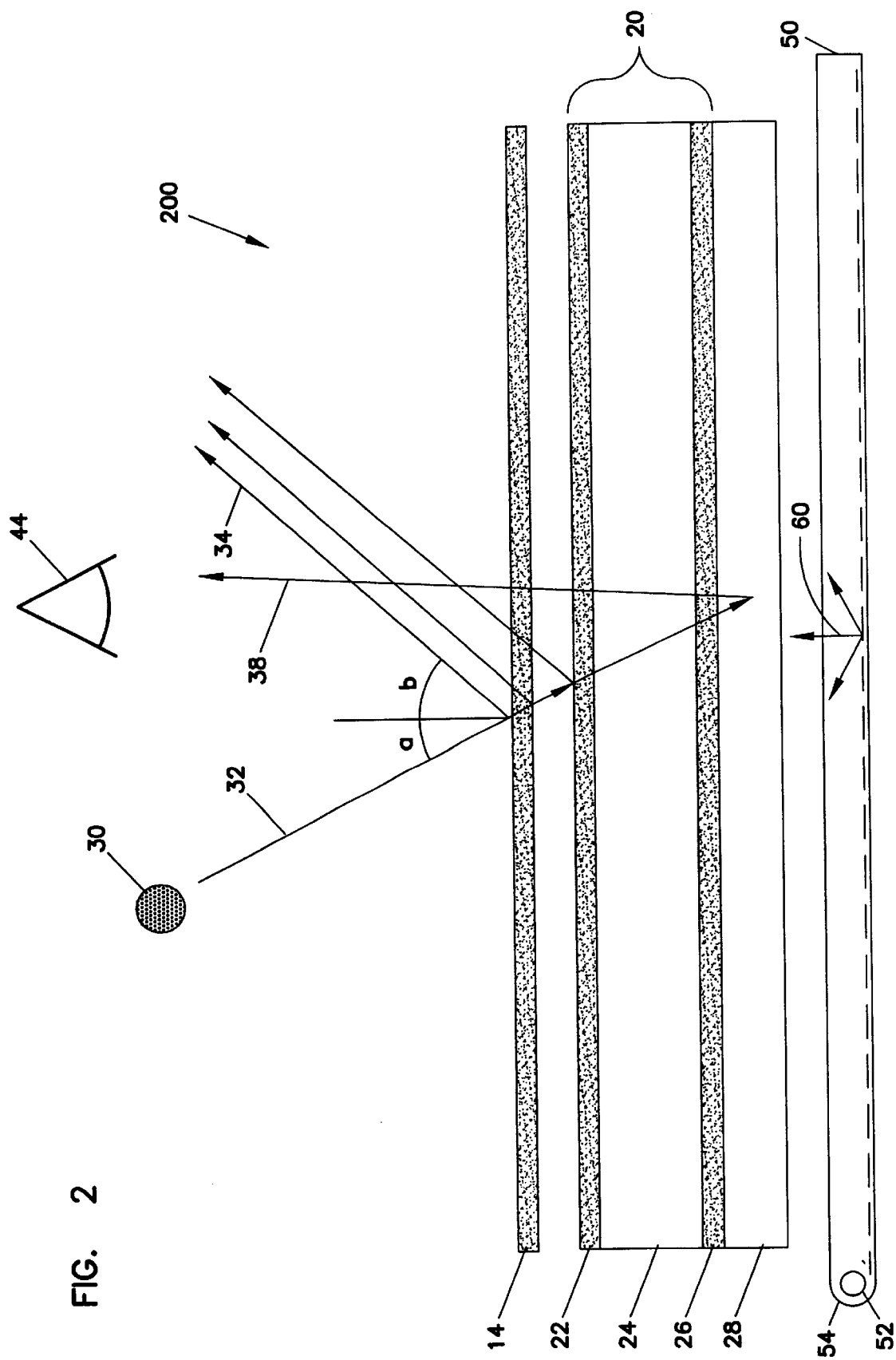
FIG. 2 is a cross-sectional view of a display apparatus of another embodiment of the present invention, including a light directing film and a light cavity.

FIG. 2 illustrates an alternate display device 200 of the present invention, wherein components that are similar to the embodiment of FIG. 1 have identical reference numbers. Display device 200 includes a light cavity 50, for providing light to the light modulating layer 24 and illuminating the display apparatus 200. The light cavity 50 includes a light source 52 and a reflector 54. The light cavity 50 may be configured in many different arrangements, to direct light 60 toward the light modulating layer 20. For example, the light cavity 50 may be an edge-illuminated light guide, an electroluminescent panel, or one of many other light cavity arrangements that are known in the art.

Figure 3:
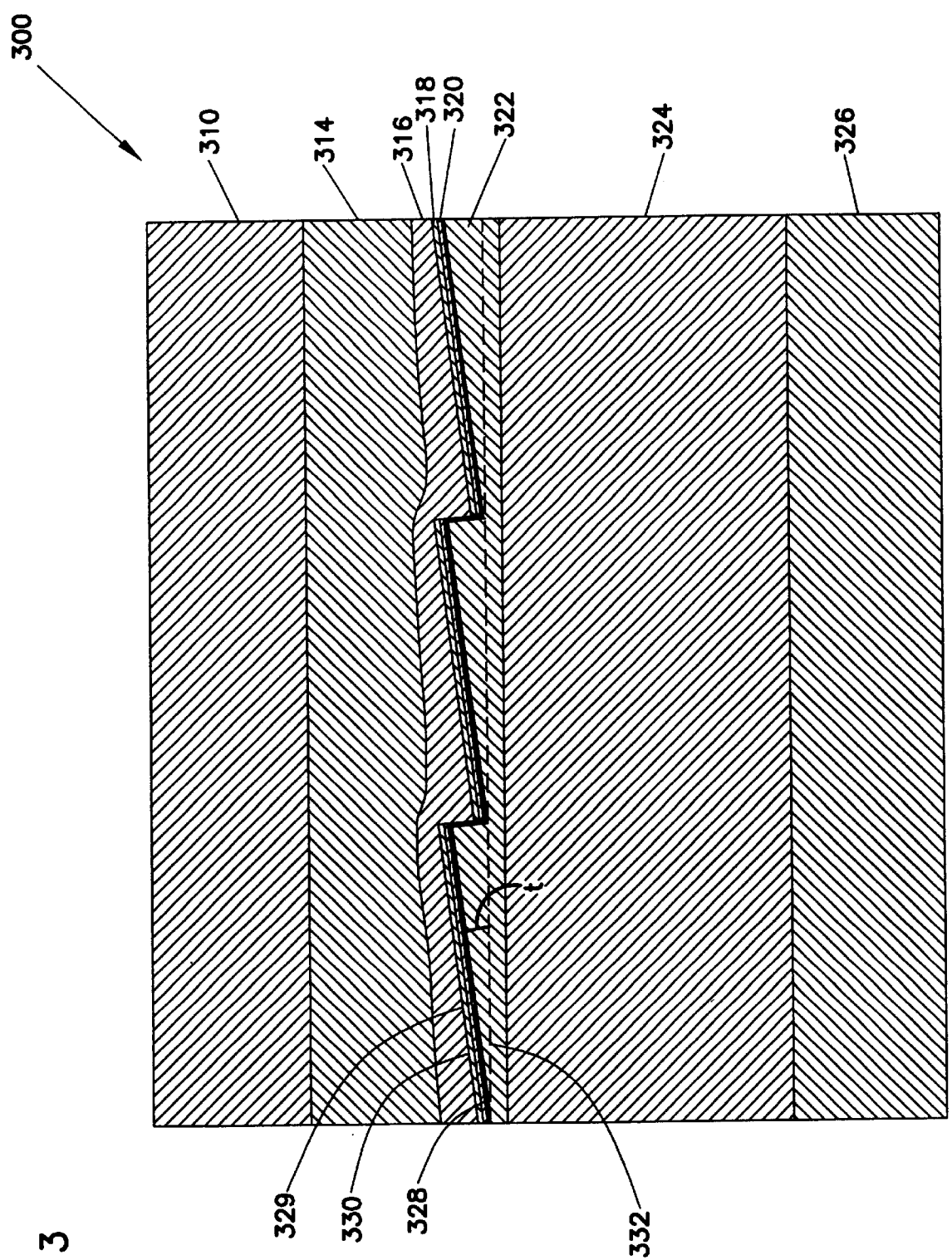
FIG. 3 is a cross-sectional view of one embodiment of a light directing film of the present invention, before incorporation into a display apparatus.
Figure 4:
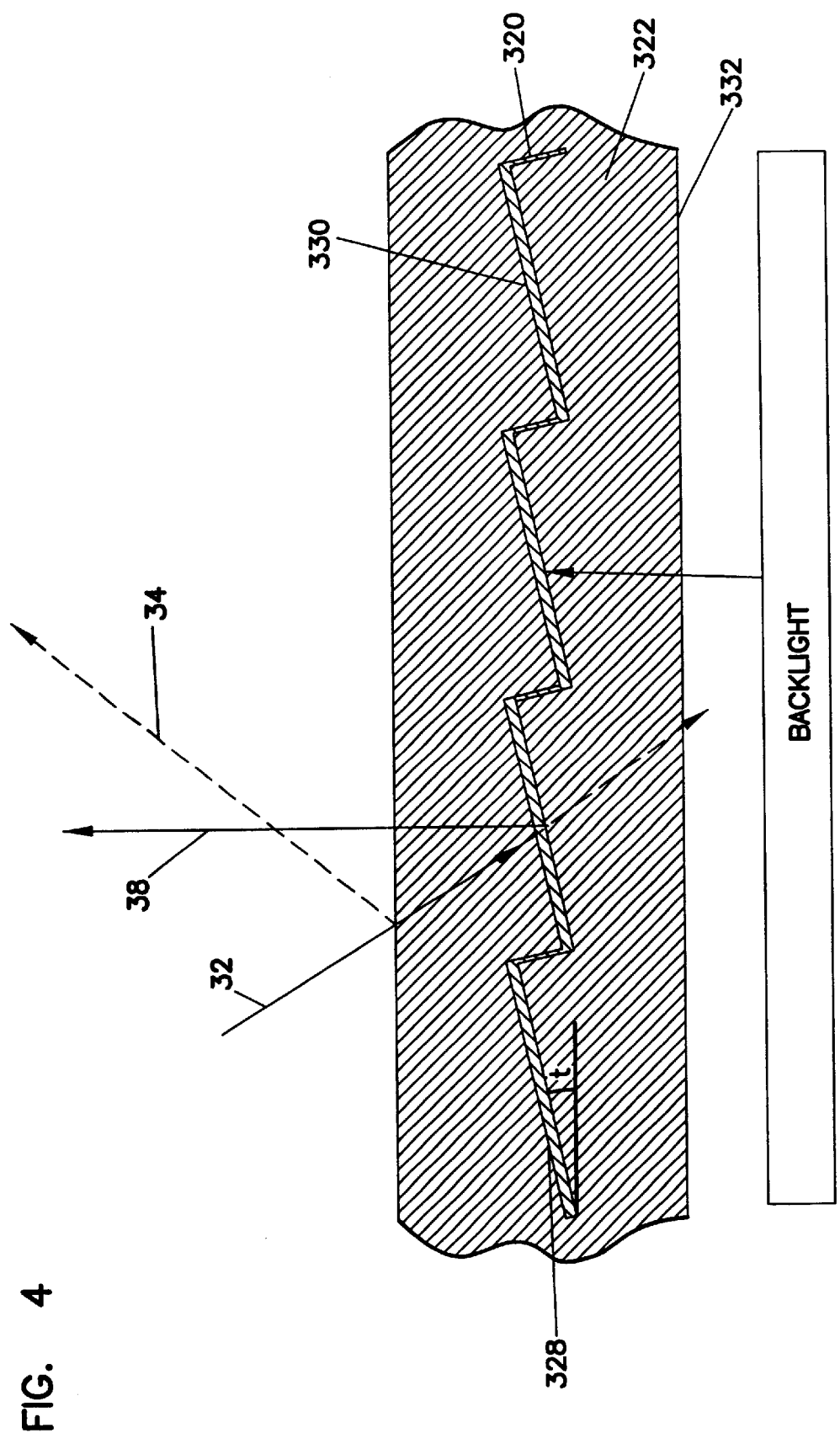
FIG. 4 is a cross-sectional view of a second embodiment of a light directing film of the present invention.

FIG. 3 shows a more detailed view of the cross section of one embodiment of a titled mirror film or light directing film 300, before it is incorporated into a display device. The light directing film includes a silicone liner 310, a pressure sensitive adhesive 314, an optional polymer protective layer 316, an optional inorganic protective layer 318, and a metal layer 320. The metal layer 320 provides a reflective surface for reflecting the ambient light toward the light modulating layer to produce a display image. The silicone liner 310 may be provided on the light directing film 300 to cover the adhesive 314. The silicone liner 310 is removed before the pressure sensitive adhesive 314 is attached to the bottom polarizer 26.

The metal layer 320 is formed on a prismatic structure 322, that is adjacent to a polymer substrate 324. Throughout the text, the words "formed on" or "formed over" will be used to refer to a layer that is formed on top of, but not necessarily directly adjacent to, another layer. Accordingly, the metal layer may not be directly adjacent to the prismatic structure. Intervening layers could be present.

A protective liner 326 may be adjacent to the polymer substrate 324, on the side opposite from the metal layer 320, if needed, to protect the polymer substrate during shipping or after incorporation into the display apparatus. The prismatic structure 322 includes two sides, where one side 328 includes saw tooth formations 329 having tilted surfaces 330. A second side 332 of the prismatic structure 322 is preferably substantially smooth or planar.

The prismatic structure 322 is configured to direct the display image ray 38 to emerge from the display apparatus at an angle substantially different from the glare ray 34, which has an angle b from the normal. In order to accomplish the redirection of the image, the prismatic layer 322 includes tilted surfaces 330. The tilted surfaces are configured so that the peak, or greatest brightness, of the display image occurs at an angle that is different than the peak viewing angle of the glare image.

It is helpful to consider the orientation of a typical viewer of an LCD. For many LCD's in hand-held devices, the typical viewer will orient the display at about 30° from horizontal. The viewer's eyes will be at about 10° from the normal. The ambient light source is assumed to be directly overhead. Therefore the ambient light is incident on the display at an angle a, which is said to be −30° from the display normal. The glare image will then have a peak at about 30° from the display normal. The light directing film of the present invention functions to direct the display image to an optimal viewing angle, or peak brightness angle, that is substantially different from the glare angle. In the preceding example, the optimal viewing angle would be substantially different from 30° away from the normal. Of course, the display will function to redirect the peak brightness angle to be different than the glare angle in situations where the incidence angle is not −30° from normal. There will be a functional relationship between the light incidence angle and the peak brightness angle.

In order to accomplish the redirection of the optimal viewing angle, the tilted surfaces 330 have a tilt angle t of about 1° to 35° from horizontal in one embodiment. Preferably, the tilted surfaces have a tilt angle of about 3° to 12° from horizontal. Most preferably, the tilt angle I will be about 6–9° from the horizontal. These preferred tilt angles are determined based on the typical viewer scenario mentioned above, and are also dependent on the qualities of a particular LCD.

In many applications, it is desirable for the repeat distance of the saw tooth formations 329, to be small enough so that the saw tooth formations are not perceptible to the human eye at the typical viewing distance. The repeat distance may also be defined as the horizontal distance between saw tooth formations. However, the saw tooth formations should be large enough to be capable of being reliably formed. The smaller the formation, the more difficult the production procedures for manufacturing the prismatic layer. In a hand-held LCD with a typical viewing distance of about 40 to 60 cm, the repeat distance in one embodiment ranges from about 5 microns or more to about 200 microns or less. More preferably, the repeat distance may range from 30 microns to about 80 microns. Most preferably, the saw tooth formations have a repeat distance of about 50 microns. However, where the display is much larger and viewed from a greater distance, such as for a billboard or roadside sign, the repeat distance may be substantially larger.

The prismatic structure may include a cured resin, an embossable, thermoplastic material, or another material capable of forming the saw tooth formations and having the desired optical properties. Preferably, the prismatic structure is formed of a cured resin, such as a cross-linked epoxy-acrylate. Preferably, the prismatic structure 322 provides smooth surfaces for metal deposition, and has excellent adhesion to both the polymer substrate 324 and to the metal layer 320. The prismatic structure is preferably pinhole free. The composition of the prismatic structure 322 is preferably highly transmissive of visible light, scratch resistant, and has low outgassing. Preferably, the resin retains the saw tooth form without shrinkage when cured and when exposed to heat and humidity. Further, preferably the material of the prismatic structure is non-halogenated, more preferably non-brominated because halogen agents, especially bromine, may cause corrosion of the metal layer.

One example of a cross-linked epoxy acrylate that is preferred for use in the prismatic structure is a UV curable composition including the following components, which are listed with a range of percentage weight: bisphenol-A epoxy diacrylate (55–80%), methyl styrene (5–25%), acrylated epoxy (1–10%), a photoinitiator (0.25–5%) (such as Lucirin TPO), and fluorosurfactant (0.1–0.3%). Further, the composition may or may not include a second photoinitiator, such as Irgacure 184, at a percentage weight up to 5%. The lack of a significant amount of a halogen agent heavier than flourine is an advantage because of the corrosive effect of some halogen agents on some metals, particularly on silver. Although the fluorosurfactant is a halogen, it is relatively inert, present in only small quantities, and at least partially evaporates when the metal layer is formed on the prismatic layer. The presence of the methyl styrene may contribute to the favorable adhesion characteristics with the polymer substrate and with the metal layer. This composition provides the advantages mentioned above, and also changes the mechanical properties of the metal surface, making it less brittle. This composition is more completely described in a co-pending U.S. patent application Ser. No. 09425270 titled "Compositions and Structures Made Therefrom", filed on the same date as the present application.

The saw tooth formations 329 can be formed in the prismatic structure 322 by many different methods known in the art, such as applying the resin structure between a substrate and a tool having saw tooth formations and polymerizing the composition under UV radiation, then separating the sheet from the tool. Other formation methods are also known and may be utilized in the present invention. Assuming that the apex angle is 90°, the thickness of the prismatic structure from a peak to a valley can be determined based on the repeat distance(r) and tilt angle (t), where:

$$\text{Thickness} = (r/2)\sin(2t)$$

Figure 10:
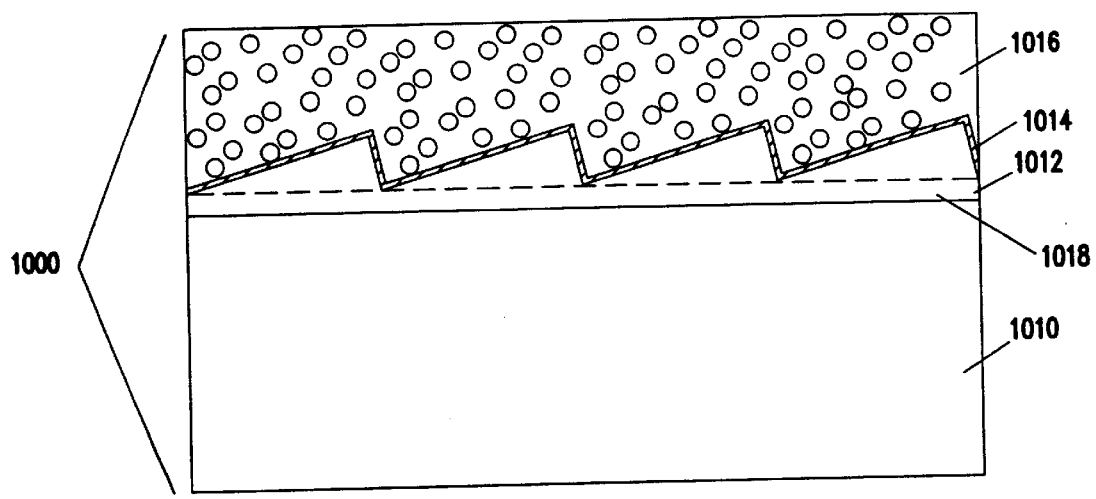
FIG. 10 is a cross-sectional view of another embodiment of a light directing film of the present invention.

For example, a prismatic structure with a 6–7° tilt angle and a 50 micron repeat distance, may have a peak to valley thickness in the range of 5–7 microns. Positioned as a base to the triangle portions of the saw tooth formations, the prismatic structure may include a "land portion" that is a flat layer component underneath the triangle portions. The prismatic structure 322 of the embodiment of FIG. 3 has a land portion below the dashed line within the prismatic layer 322. The embodiments of FIGS. 10–11 also include a land portion 1018 or 1118 of the prismatic structure 1012 or 1112, below the dashed line. The land portion of the prismatic structure may be in the range of 0 to 3 microns, and may depend on the process used to form the prismatic structure. Preferably, the land portion of the prismatic structure has a thickness of about 0.5 microns.

The metal layer 320 is formed on the saw tooth formations 328 of the prismatic structure 322. The metal layer 320 is preferably highly reflective, and partially transmissive. The transmissivity of the metallic layer 320 makes it possible to use a light cavity 50 in the display apparatus, as illustrated in FIG. 2. The metal layer may be composed of many different materials capable of forming reflective layers including, one or more of: silver, chromium, nickel, aluminum, titanium, aluminum-titanium alloy, gold, zirconium, platinum, palladium, aluminum-chromium alloy or rhodium. The metal layer may be formed on the prismatic substrate using many different methods that are known in the art, including vacuum deposition or plating. Suitable vacuum deposition techniques include sputtering, evaporation and cathodic arc deposition. Plating techniques such as electroplating or solution plating could also be used. The metal layer 320 may have a thickness greater than or equal to about 25 angstroms and less than or equal to about 3000 angstroms. Preferably, the metal layer has a relatively uniform thickness.

Preferably, the metal layer is partially transmissive, allowing light from an internal light cavity to illuminate the display. The most preferred materials for a partially transmissive metallic layer are silver and aluminum, because of their reflective and transmissive qualities as thin layers. Silver is most preferred for its low light absorption, meaning that the sum of the reflectivity and the transmissivity of silver is high compared to other materials. In the preferred embodiment, the metal layer is a silver layer of about 400 angstroms. However, two factors limit the performance of silver in a transflective liquid crystal display apparatus. Silver is vulnerable to attack by airborne pollutants and solid borne ions, reactive monomers and solvents. Airborne pollutants that may attack silver include compounds from tail pipe emissions and the components of acid rain, especially those including sulfur. In addition, silver is more transmissive than aluminum in the blue visible light range. While aluminum appears neutral in color, silver has a yellowish cast. In addition to silver, other metals are also vulnerable to corrosion and other types of damage and have color characteristics that favor a particular color.

To address these issues, one embodiment of the present invention includes an inorganic protective layer 318 formed on the metal layer, where the inorganic protective layer inhibits molecular transfer to the metal layer. In addition, the inorganic protective layer 318 preferably balances the color of the light that is reflected and transmitted by the metal layer 320. Preferred materials for the inorganic protective layer include indium tin oxide (ITO), zinc sulfide (ZnS), tin oxide, indium oxide and titanium oxide. Where these materials are used, in combination with a silver layer, where a colorless reflectance and transmission spectra is desired, the inorganic protective layer may have a thickness greater than or equal to about 300 angstroms and less than or equal to about 1000 angstroms. These types of inorganic protective layer do provide protection for the metal layer at thinner layers, but the color correction properties may also be considered when determining the thickness of the inorganic protective layer. Silver metal reflectivity is higher at the red end of the visible spectrum than the blue end. Use of ITO, ZnS, or other dielectric materials on the silver will shift the relative reflectivity as a function of wavelength so that the reflected light is redder, bluer or more neutral, depending on the dielectric thickness, than is seen with the native silver reflectivity. This color shifting first occurs in the thickness range of 300 angstroms to 1000 angstroms, and repeats at higher order thickness'. For each type of metal layer and each type of inorganic protective layer, any color correction requirements are preferably be considered when determining the thickness of the inorganic protective layer.

Other possible materials for the inorganic protective layer include titanium and its oxides, where the layer would have a thickness greater than or equal to about 10 angstroms and less than or equal to about 3000 angstroms. In addition, the inorganic protective layer 318 may be selected from the group consisting of silicon dioxide, silicon monoxide, and magnesium fluoride, with a thickness of greater than or equal to about 300 angstroms and less than or equal to about 1500 angstroms. Other metals and alloys, their oxides and suboxides can be used where the material is deposited from the metallic source and is oxidized by subsequent exposure, such as titanium.

ITO demonstrates the most favorable properties for use as the inorganic protective layer on a silver metal layer. Zinc sulfide and titanium are also preferred materials for use as the inorganic protective layer in some devices.

It may be desirable in some displays to include a tie layer or nucleation layer on one or both sides adjacent to the metal layer, to improve film formation. Some examples of commonly used tie layers include titanium, chromium, zirconium, nickel iron chromium or other alloys. However, in the preferred embodiment of the invention where silver is used as the metal layer and ITO or ZnS is used as the inorganic protective layer, the use of a tie layer did not substantially improve the performance of the light directing film.

Figure 5:
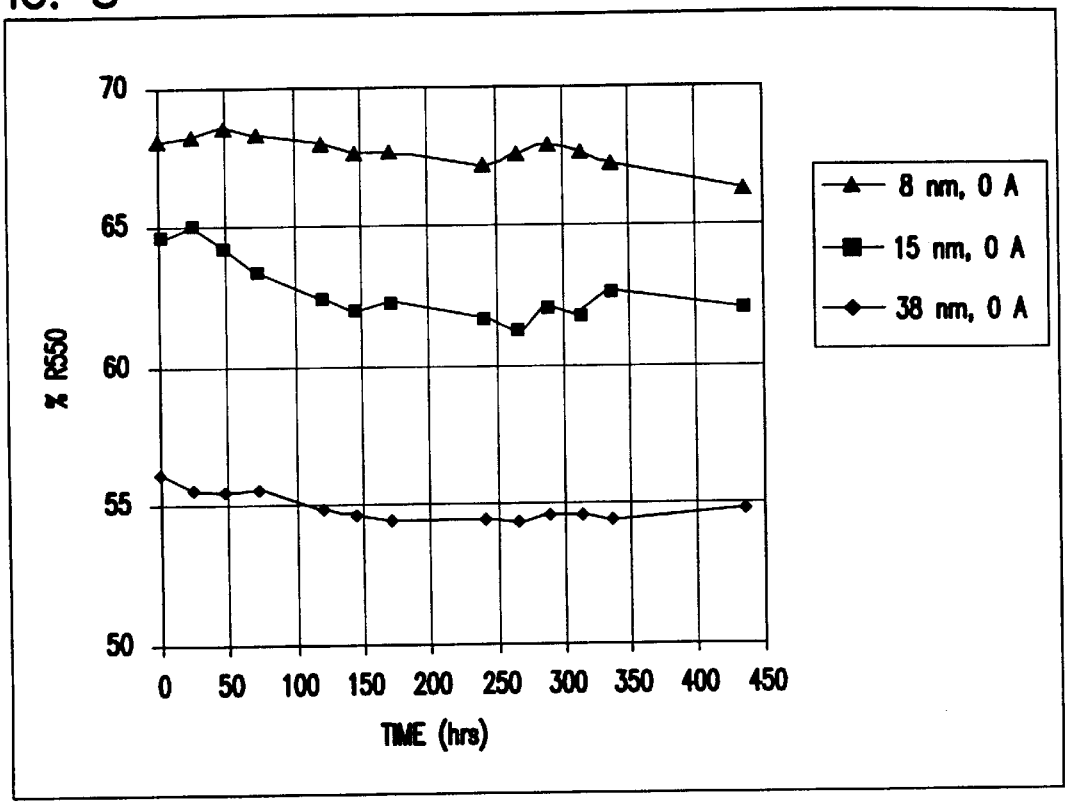
FIG. 5 illustrates time versus reflectivity during weathering for a silver/indium tin oxide film.

FIG. 5 shows the reflection change during weathering of a silver layer coated with ITO. Accelerated environmental tests were carried out for ITO/Ag films with a constant Ag thickness of 33 nm and varied ITO thicknesses of 8 nm, 15 nm, and 38 nm. The ITO/Ag films were coated with a pressure sensitive adhesive with diffusing properties and were then laminated to glass. The samples were then placed in an environment with a temperature of 65° C. and 95% relative humidity, and the reflectance of the samples were measured at regular intervals. Most ITO/Ag films were found to be quite protective.

Figure 6:
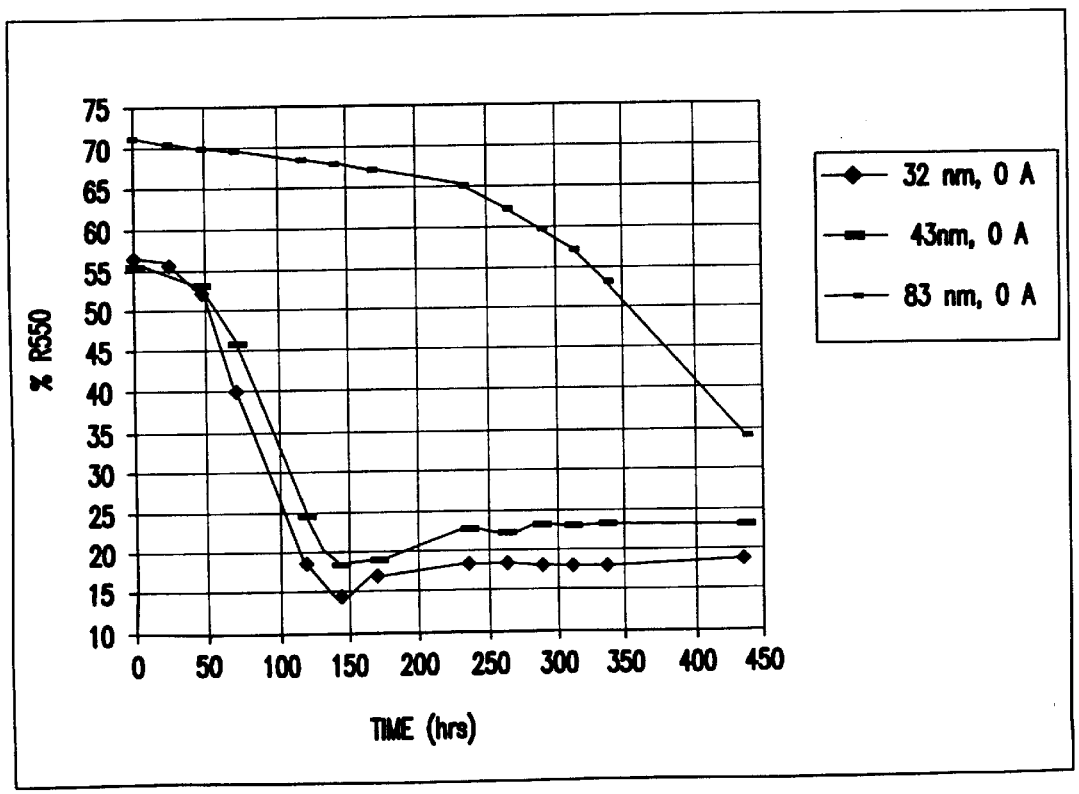
FIG. 6 illustrates time versus reflectivity during weathering of a silver/zinc sulfide film.

FIG. 6 shows the reflection change of a silver and ZnS layer during accelerated environmental tests. To produce the data found in FIG. 6, a silver coating with a constant thickness of 33 nm was combined with varied ZnS thicknesses of 33 nm, 43 nm, and 83 nm. The Ag/ZnS films were coated with a pressure sensitive adhesive with diffusing properties and were then laminated to glass. The samples were then placed in an environment with a temperature of 65° C. and 95% relative humidity. The thickest ZnS films offered protection. However, the performance of the ZnS films was not as good as the protection provided by the ITO films.

Figure 7:
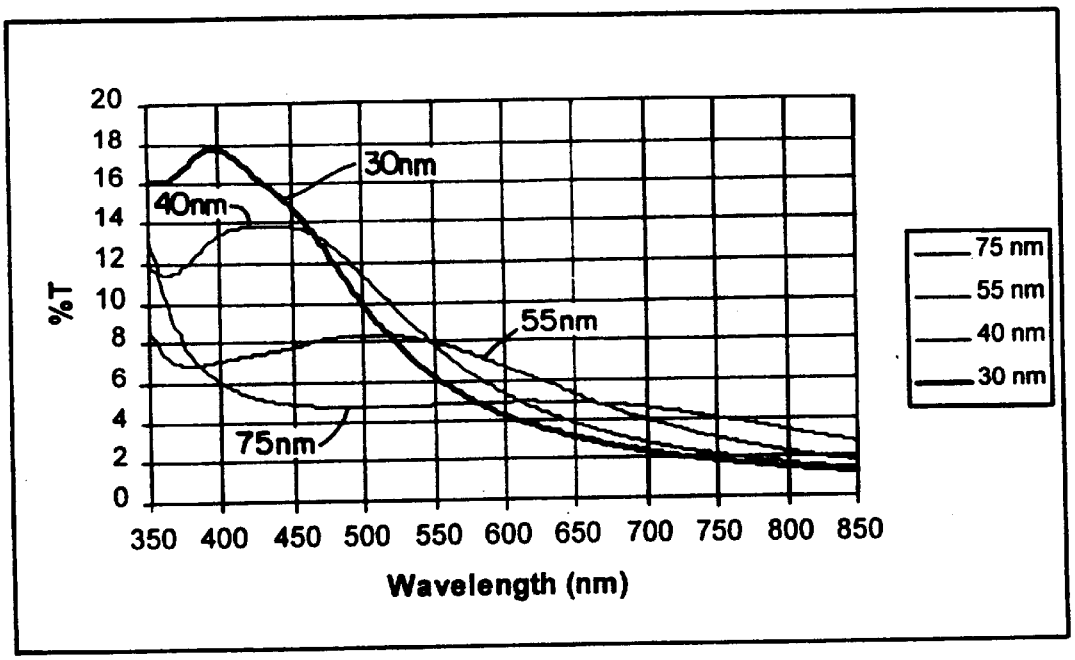
FIG. 7 illustrates the transmission spectra for a silver/indium tin oxide coating on a light directing film.
Figure 8:
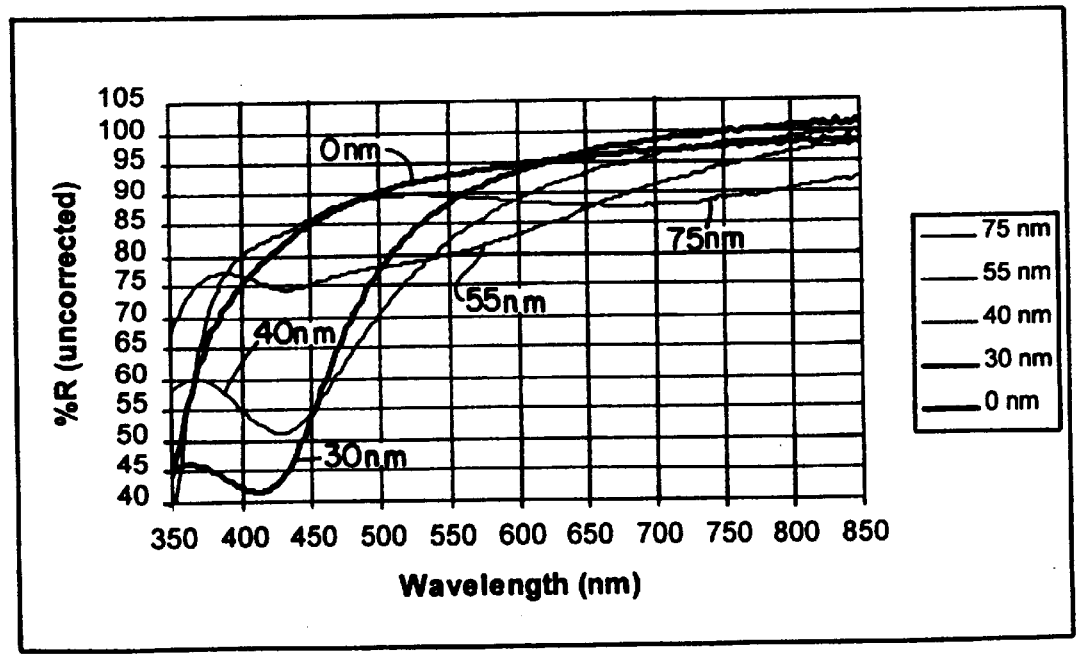
FIG. 8 shows the reflection spectra for a silver/indium tin oxide coating on a light directing film.

FIG. 7 shows the transmission spectra for an ITO/Ag coating on a light directing film with a fixed silver thickness of 50 nm and varied ITO thicknesses of approximately 30 nm, 40 nm, 55 nm, and 75 nm. A variation of the ITO thickness changes the transmitted color of the full construction. FIG. 8 shows the reflection spectra for an ITO/Ag coating on a light directing film with the same qualities as the film used for FIG. 7. Again, a variation of the ITO thickness changed the reflected color of the full construction. For FIGS. 7 and 8, the transmission spectra was measured without the adhesive layer.

Now referring to FIG. 3, the pressure sensitive adhesive 314 is preferably an optically diffuse layer. In one embodiment of the invention, the pressure sensitive adhesive layer includes an acrylate acrylic acid adhesive. The adhesive 314 may include optical diffuser particles, dispersed throughout the adhesive layer to improve the diffusive properties of the adhesive layer.

The adhesive layer may inhibit corrosion and other damage of the metal layer, by providing a deterrent to the migration of molecules between the bottom polarizer 26 and the metal layer 320. The polarizer may contain halogens and other reactants, that may migrate to the metal layer 320, causing corrosion and other damage. For example, iodine may migrate to the metal layer from the polarizer causing corrosion. However, in the preferred embodiment, the adhesive deters the migration of molecules including iodine to the metallic layer, thereby extending the lifetime of the metallic layer 320.

The pressure sensitive adhesive may be of the type butyl acrylate/acrylic acid, having a ratio between 90/10 and 97/3, iso-octyl acrylate acrylic acid having a ratio between 90/10 and 97/3, or iso-octyl acrylate/acrylic acid/isobornyl acrylate/Regalrez 6108 having a ratio of approximately 66.3/0.67/13.4/19.3. The adhesive may be used in combination with one or more of bisamide cross-linker, benzoyl peroxide initiator, an aziridine cross-linker, a chlorinated cross-linker such as XL-330, Irgacure 651 cross-linker, or other standard acrylic adhesive cross-linkers. In addition, the adhesive may contain one or more of the following additives: benzotriazole, 5-amino benzotriazole, 5-butyl benzotriazole, benzotriazole 5-carboxylic acid, octadecyl thiol, or thiosilanes. One example of a pressure sensitive adhesive that may be used with the present invention is described in PCT WO 99/21913, which is hereby incorporated by reference. The diffusive quality of the pressure sensitive adhesive layer may be adjusted by modifying the concentration of diffusing particles suspended within the adhesive, depending on the specific level of diffusion that is desired.

In one embodiment of the present invention, the light directing film 300 includes a polymer barrier layer or polymer protective layer 316, formed on the inorganic protective layer 318. The polymer protective layer 316 inhibits molecular transfer to the metal layer 320 in this embodiment. The polymer protective layer may or may not be used in combination with the inorganic protective layer. The polymer protective layer or polymer layer 316 is selected from a group consisting of cross-linked epoxy resin, cross-linked or linear acrylic resin, epoxy acrylate, polyester such as Vitel®, polyethylene, polyvinylidene chloride, and polyvinyl alcohol. One example of a cross-linked acrylic resin that may be used has the tradename B48N, produced by Rohm and Haas, 100 Independence Mall West, Philadelphia, Pa. 19106-2399.

If the polymer protective layer is used in combination with the inorganic protective layer, then the polymer protective layer 316 will typically be deposited on the inorganic protective layer, as illustrated in FIG. 3. Where the polymer protective layer is used in a light directing film without the inorganic protective layer, then the polymer protective layer is typically deposited directly onto the metal layer. The construction of such an arrangement would be similar to the construction of FIG. 3, if the inorganic protective layer 318 were eliminated.

The polymer protective layer may be formed using a variety of methods known in the art. For example, the polymer protective layer is preferably solution coated, in which case the thickness of the polymer protective layer 316 may range from about 0.01 micron to about 50 microns. The polymer protective layer may be conformally deposited on the metal layer or inorganic protective layer, or may planarize or partially planarize the underlying saw tooth formations.

Where the polymer protective layer 316 has a planarizing function, one side of the layer has tilted surfaces corresponding to the tilted surfaces of the prismatic structure, and a second side of the layer 316 is substantially planar. It is possible that the polymer protective layer 316 may include more than one layer. For example, if the polymer protective layer is intended to planarize the underlying prismatic structure, it may include more than one layer. Also, depending on the material that is used, more than one layer may be desirable to ensure that the polymer protective layer functions as a proper barrier.

One possible method for forming the polymer protective layer 316 is vapor depositing volatile monomeric or oligomeric polymer precursors, then curing the precursors. The deposition may take place at normal atmospheric pressure or under vacuum. Curing may be accomplished using either thermal, ultraviolet, or electron beam radiation, or plasma or corona exposure. One example of such a method for conformal deposition and some examples of specific materials are described in U.S. Pat. No. 6,172,810, titled "Retroreflective Articles Having Polymer Multilayer Reflective Coatings" and U.S. Ser. No. 09/259,487, titled "Method of Coating Microstructured Substrates with Polymeric Layer (s), Allowing Preservation of Surface Feature Profile", which are both incorporated by reference herein. Using the method described in these two above-referenced documents, a typical polymer protective layer would have a thickness of about 1 nm to about 2 micron. In some embodiments, this method may be preferred to solution coating the polymer protective layer, because the solvent used in solution coating may be detrimental to the metal layer or other layers of the display apparatus. The polymer protective layer could also be deposited using plasma processes such as plasma polymerization or plasma-enhanced chemical vapor deposition, as is known in the art.

One preferred material for the polymer protective layer is solution-coated polymethyl methacrylate (PMMA) with a thickness of about 10 microns. The PMMA may include additives such as UV blockers and tarnish-inhibiting agents. One preferred additive to the PMMA is glycol dimercaptoacetate (GDA), a corrosion inhibitor for silver. This and other additives that may be used with the polymer protective layer are discussed in U.S. Pat. Nos. 4,307,150 and 4,645,714, which are hereby incorporated by reference herein. Alternatively, the polymer protective layer could include the UV-curable cross-linked epoxy acrylate described above as the preferred material for the prismatic structure.

Several of the embodiments of the present invention include a polymer substrate. The polymer substrate may be a material selected from the group consisting of PET, polyether sulphone (PES), polycarbonate, cellulose diacetate, and cellulose triacetate, and may be birefringent or non-birefringent. Preferably, the polymer substrate has a thickness of about 25 to 1000 microns.

Figure 9:
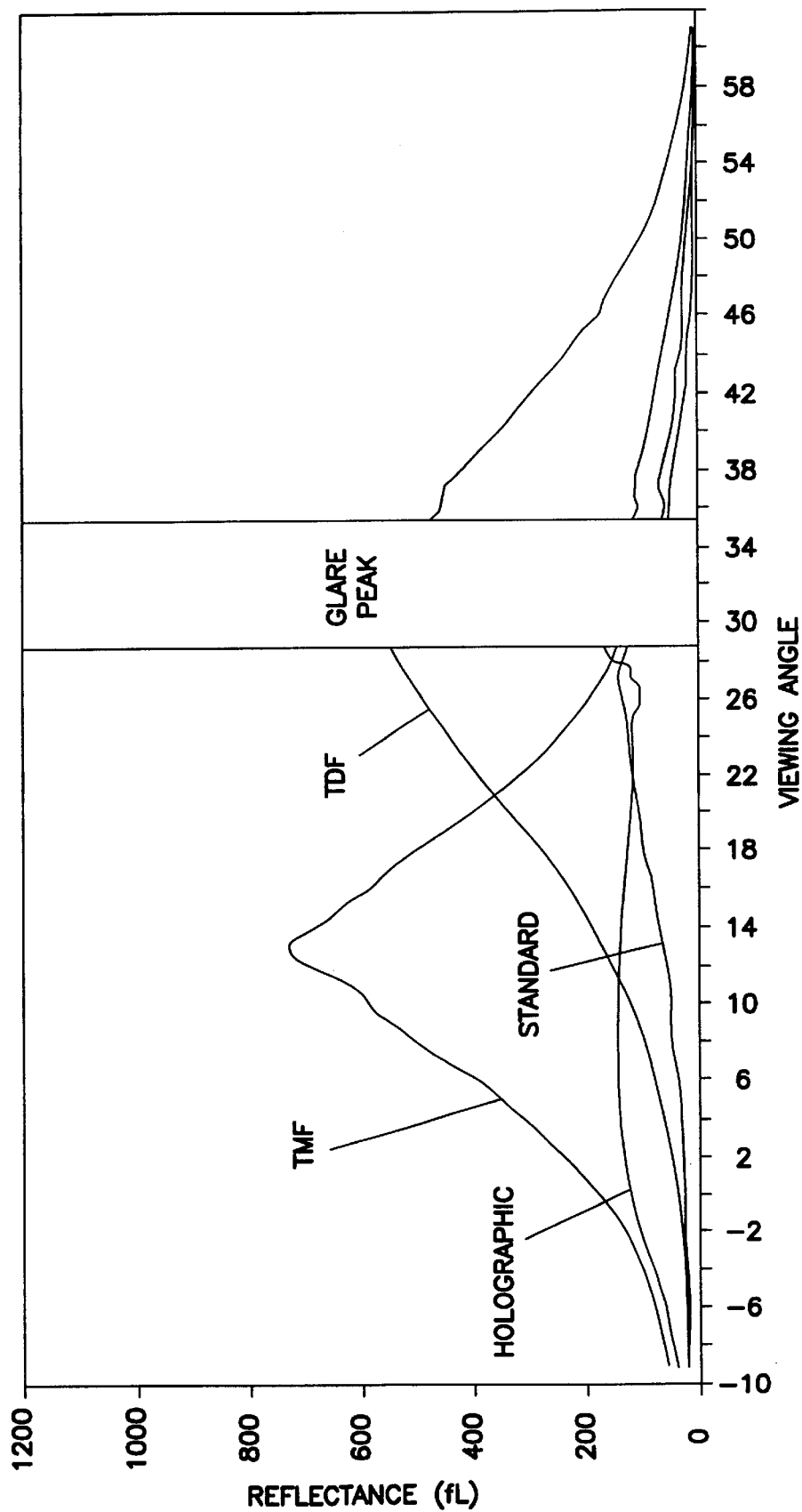
FIG. 9 illustrates the reflectance of an LCD versus the viewing angle for four different types of LCD's, where each LCD incorporates a different type of transflector.

FIG. 9 illustrates the advantage of including a light directing film in a display apparatus. FIG. 9 plots the reflected light profile, showing reflected luminescence measured in foot lamberts (fL) versus viewing angle, for four different LCD's. The four LCD's are identical except that a different transflector is used. The incident light was collimated and directed at −30 degrees to the normal.

In the TMF example, a light directing film of one embodiment of the present invention was utilized. The TMF was attached to the bottom polarizer of a light modulating layer, similar to the device illustrated in FIG. 1. Specifically, the TMF film included a polymer substrate, a polymer prismatic layer, a silver layer and a polymer protective layer of PMMA. The TMF was adhered to the back polarizer of the LCD.

The Holographic film is a reflective film formed by the action of interfering laser beams on a photoactive medium. It reflects light at a designed angle different from the glare direction, but has a hue of a single color, usually green. One example of this type of film is Imagix® film manufactured by Polaroid Corporation. The Standard transflector is a composite material formed from an adhesive matrix and a reflective particulate adhered to a clear substrate, for example using the trade name NPF-EG4225P3, manufactured by Nitto Denko. The TDF film is a 3M product comprising a diffusing adhesive coated on one side of a reflective polarizer substrate and a neutral density film coated on the back side of the substrate. TDF replaces the bottom polarizer of a reflective display, while the Holographic film and the Standard transflector adhere to the back surface of a dichroic bottom display polarizer.

In FIG. 9, the glare peak for the display is at about 28–36°. The standard, Holographic and TDF samples have brightness peaks during ambient mode performance near this glare peak. The TMF sample of the present invention has a brightness peak substantially different than this glare peak, however, at about 12°. The incident light was at −30° from normal incidence during the testing.

According to the present invention, the light directing film of FIG. 2 may be constructed in many different ways, and still accomplish the redirection of the image angle away from the glare angle, protect the metal film from corrosion and other damage, and balance color of the reflected and transmitted light. Four different construction examples are shown in FIGS. 10–13. For example, in FIG. 10, a light directing film 1000 is illustrated including a polymer film substrate 1010, a cured prismatic polymer layer 1012, a metal layer 1014, and an adhesive layer 1016. The prismatic layer 1012 includes a land portion 1018, as previously discussed, below the dashed line through the prismatic structure. The adhesive layer 1016 planarizes, or back-fills the saw tooth formations of the prismatic layer 1012. The adhesive layer 1016 may or may not contain the optical diffuser particles that are illustrated in this embodiment. The light directing film 1000 attaches to the bottom polarizer of a reflective LCD using adhesive layer 1016. The light directing film 1000 will also include at least one additional layer adjacent to the metal layer 1014, according to the invention, such as an inorganic protective layer, a polymer protective layer, or both, that are not illustrated in FIG. 10.

Figure 11:
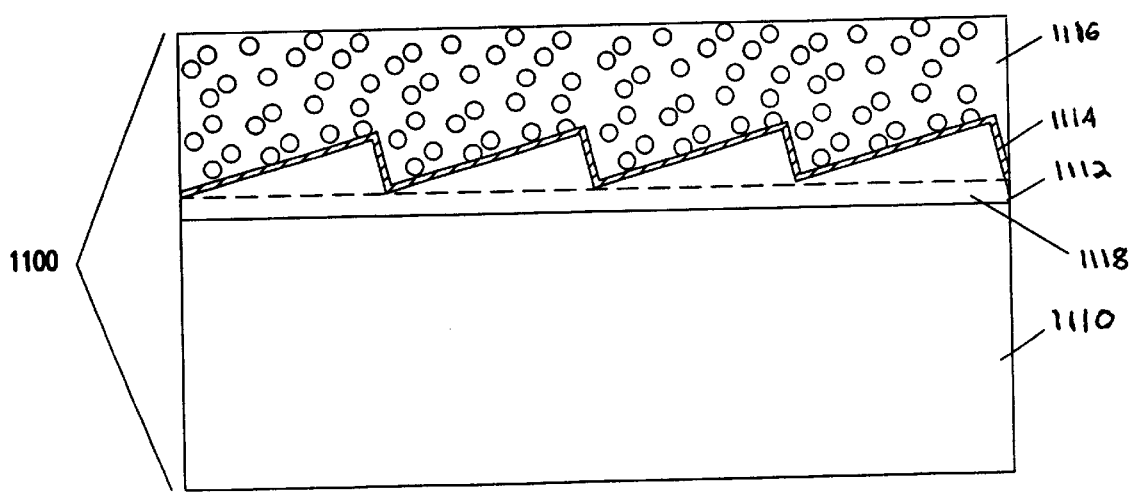
FIG. 11 is a cross-sectional view of another embodiment of a light directing film of the present invention.

FIG. 11 shows a cross-section of a light directing film 1100, including a polymer film substrate 1110, a cured prismatic polymer layer 1112, a metal layer 1114, and a cured polymer layer 1116. The prismatic layer 1112 includes a land portion 1118, as previously discussed, below the dashed line through the prismatic structure. The cured polymer layer 1116 may planarize or back-fill the saw tooth formations, and may or may not contain optical diffuser particles. The light directing film 1100 may be positioned in a display apparatus with the cured polymer layer 1116 adjacent to the bottom polarizer of a reflective LCD and may be bonded with an adhesive native to the polarizer. Therefore, in this embodiment, the pressure sensitive adhesive is resident within the polarizer. The light directing film 1100 will also include at least one additional layer adjacent to the metal layer 1114, according to the invention, such as an inorganic protective layer, a polymer protective layer, or both, that are not illustrated in FIG. 11.

Figure 12:
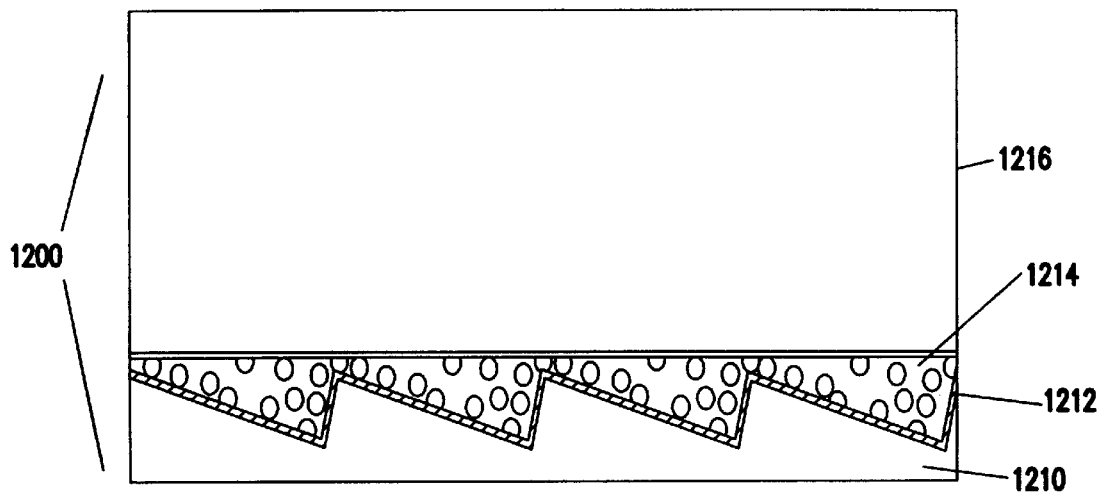
FIG. 12 is a cross-sectional view of another embodiment of a light directing film of the present invention.

FIG. 12 illustrates another embodiment of a light directing film 1200 of the present invention. The light directing film includes a cured polymer layer 1210, a cured prismatic polymer layer 1214, which may or may not contain optical diffuser particles, a metal layer 1212, and a polymer film substrate 1216. In the embodiment of FIG. 12, the optical diffuser particles are present within the prismatic layer 1214, rather than in the adhesive layer. The optical diffuser particles might also be included in other layers of the construction, such as the polymer protective layer, that are between the metal layer and the ambient light source. The metal layer 1212 is formed on the cured prismatic polymer layer 1214, and the cured polymer layer 1210 back-fills the prisms. The light directing film 1200 is positioned with the substrate 1216 adjacent to the bottom polarizer of a reflective LCD and may be bonded with an adhesive native to the polarizer. Therefore, in this embodiment, the pressure sensitive adhesive is included within the polarizer. The light directing film 1200 will also include at least one additional layer adjacent to the metal layer 1212, according to the invention, such as an inorganic protective layer, a polymer protective layer, or both, that are not illustrated in FIG. 12.

Figure 13:
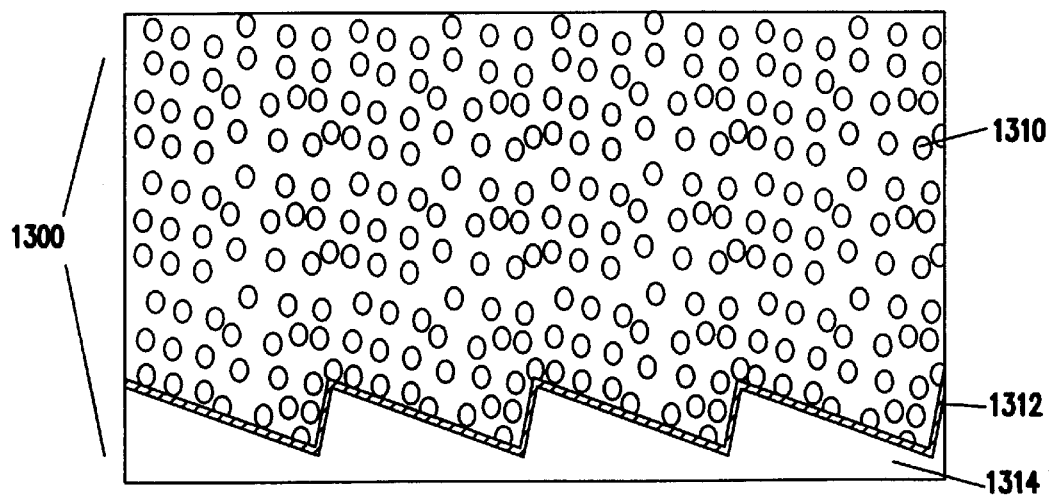
FIG. 13 is a cross-sectional view of another embodiment of a light directing film of the present invention.

FIG. 13 shows a light directing film 1300 including a polymer film substrate 1310, which may or may not contain optical diffuser particles, a metal layer 1312 formed on the polymer film substrate 1310, and a cured polymer layer 1314, which back-fills the saw tooth formations. In this embodiment, the diffusing characteristic is provided by the polymer film substrate 1310 rather than by the adhesive layer. The light directing film 1300 is positioned with the polymer film substrate 1310 adjacent to the bottom polarizer of a reflective LCD and may be bonded with an adhesive native to the polarizer. Therefore, in this embodiment, the pressure sensitive adhesive is included within the polarizer. As in FIGS. 10–12, the embodiment of FIG. 13 will also include at least one additional layer adjacent to the metal layer 1312, according to the invention, such as an inorganic protective layer, a polymer protective layer, or both, that are not illustrated in FIG. 13

This invention provides a reflective or transflective optical film multilayer construction that can serve as a component of an information display device, such as an LCD in a cellular telephone. Back reflectors and transflectors, and other light control elements in such devices are subjected to high heat and/or humidity conditions in field use and in product qualification. Previously, similar constructions using thin metal films as the reflective/transflective layer failed under these conditions by losing reflectivity or optical density.

The variants of the light directing film listed below have been tested and can survive harsh environmental conditions. The following compositions showed only negligible degradation of transmissivity and reflectivity after being subjected to 65° C. at 95% relative humidity for at least 240 hours. The reflectivity, averaged over the visible spectrum suffered less than 3% degradation during the environmental tests. These compositions were attached to a polarizer during testing.

EXAMPLES

1. A construction of:
a) a polymer substrate of 5 mil polyester;
b) a prismatic structure of bromine-free epoxy acrylate resin;
c) a metal layer of about 200 angstroms aluminum;
d) an inorganic protective layer of about 50 angstroms titanium; and
e) a pressure sensitive adhesive layer of butyl acrylate/ acrylic acid (ratio about 90/10); survived 400 hours of 65 C. at 95% relative humidity with negligible degradation (less than 3%) of the transmissivity and reflectivity of the construction in the visible wavelengths.

2. A construction of:
a) a polymer substrate of 5 mil polyester;
b) a prismatic structure of bromine-free epoxy acrylate resin;
c) a metal layer of about 400 angstroms silver,
d) an inorganic protective layer of about 500 angstroms zinc sulfide; and
e) a pressure sensitive adhesive layer of butyl acrylate/ acrylic acid (ratio about 90/10); survived 480 hours of 65 C. at 95% relative humidity with negligible degradation (less than 3%) of the transmissivity and reflectivity of the construction in the visible wavelengths.

3. A construction of:
a) a polymer substrate of 5 mil polyester;
b) a prismatic structure of bromine-free epoxy acrylate resin;
c) a metal layer of about 400 angstroms silver;
d) a polymer protective layer of PMMA; and
e) a pressure sensitive adhesive layer of butyl acrylate/ acrylic acid (ratio about 90/10); survived over 240 hours of 65° C. at 95% relative humidity with negligible degradation (less than 3%) of the reflectivity and transmissivity of the construction in the visible wavelengths.

As noted above, the present invention is applicable to a number of different LCD's including reflective layers. Accordingly, the present invention should not be considered limited to the particular examples described above, but rather should be understood to cover all aspects of the invention as set out in the attached claims. Various modifications, equivalent processes, as well as numerous structures to which the present invention may be applicable will be readily apparent to those of skill in the art upon review of the present specification. The claims are intended to cover such modifications and devices.

We claim:

1. A display apparatus comprising:
   a light modulating layer;
   a polarizer; and
   a light directing film, comprising:
   a prismatic structure having two sides, one side including saw-tooth formations having tilted surfaces;
   a metal layer on the side of the prismatic substrate having the saw-tooth formations;
   an inorganic protective layer formed on the metal layer, wherein the inorganic protective layer inhibits molecular transfer to the metal layer; and
   a pressure sensitive adhesive layer between the polarizer and the inorganic protective layer;
   wherein the display apparatus has a glare angle at which front surface glare is viewed and wherein a tilt angle of the tilted surfaces offsets an optimal viewing angle for the display from the glare angle;
   wherein the inorganic protective layer protects the metal layer and balances the color of reflected and transmitted light.

2. The display apparatus of claim 1, wherein the pressure sensitive adhesive layer comprises an acrylate acrylic acid adhesive layer, the adhesive layer being optically diffuse, and wherein the adhesive layer inhibits damage to the metal layer.

3. The display apparatus of claim 1, wherein the pressure sensitive adhesive layer includes optical diffuser particles.

4. The display apparatus of claim 1, wherein the inorganic protective layer is selected from the group consisting of titanium and titanium oxides.

5. The display apparatus of claim 4 wherein the inorganic protective layer has a thickness greater than or equal to about 10 angstroms and less than or equal to about 3000 angstroms.

6. The display apparatus of claim 1, wherein the inorganic protective layer is selected from the group consisting of indium tin oxide, zinc sulfide, tin oxide, indium oxide, and titanium oxide.

7. The display apparatus of claim 6 wherein the inorganic protective layer has a thickness greater than or equal to about 300 angstroms and less than or equal to about 1000 angstroms.

8. The display apparatus of claim 1, wherein the inorganic protective layer is selected from the group consisting of silicon dioxide, silicon monoxide, and magnesium fluoride.

9. The display apparatus of claim 8 wherein the inorganic protective layer has a thickness greater than or equal to about 300 angstroms and less than or equal to about 1500 angstroms.

10. The display apparatus of claim 1, the light directing film further comprising a polymer protective layer, formed on the inorganic protective layer, the pressure sensitive adhesive layer being between the polymer protective layer and the polarizer, wherein the polymer protective layer impedes molecular transfer to the metal layer.

11. The display apparatus of claim 10, wherein the polymer protective layer is selected from a group consisting of polyester, soluble polyester, cross-linked epoxy resin, acrylic resin, epoxy acrylate, polyethylene, polyvinylidene chloride, polyvinyl alcohol and polymethyl methacrylate.

12. The display apparatus of claim 11 wherein the polymer protective layer is formed by vapor deposited and cured polymer precursor materials.

13. The display apparatus of claim 12 wherein the polymer protective layer is formed by condensing a vaporized liquid composition containing a monomer or pre-polymer onto the metal layer.

14. The display apparatus of claim 12 wherein the polymer protective layer is cured using a process selected from the group of thermal radiation, ultraviolet radiation, electron beam radiation, plasma exposure and corona exposure.

15. The display apparatus of claim 14 wherein the polymer protective layer has a thickness of about 1 nanometer to 2 micrometers.

16. The display apparatus of claim 10 wherein the polymer protective layer is formed by a plasma process selected from the group consisting of plasma-polymerization and plasma-enhanced chemical vapor deposition.

17. The display apparatus of claim 10, wherein the polymer protective layer has a thickness of about 100 to 5000 Angstroms.

18. The display apparatus of claim 10, wherein the polymer protective layer includes one side having tilted surfaces corresponding to the tilted surfaces of the prismatic structure and a second side being substantially planar.

19. The display apparatus of claim 10, wherein the polymer protective layer includes polymethyl methacrylate.

20. The display apparatus of claim 10, wherein the polymer protective layer is solution coated.

21. The display apparatus of claim 1 further comprising a polymer substrate.

22. The display apparatus of claim 21, the polymer substrate comprising a material selected from the group of PET, polyether sulphone, polycarbonate, cellulose diacetate, and cellulose triacetate.

23. The display apparatus of claim 21, the polymer substrate being birefringent.

24. The display apparatus of claim 21, the polymer substrate being non-birefringent.

25. The display apparatus of claim 21, the polymer substrate having a thickness of greater than or equal to about 25 microns and less than or equal to about 1000 microns.

26. The display apparatus of claim 1, the prismatic structure comprising cured resin.

27. The display apparatus of claim 1, the prismatic structure comprising UV curable cross-linked epoxy-acrylate.

28. The display apparatus of claim 1, the metal layer comprising a material selected from a group consisting of silver, chromium, nickel, aluminum, titanium, aluminum-titanium alloy, gold, zirconium, platinum, palladium, aluminum-chromium alloy and rhodium.

29. The display apparatus of claim 1, the metal layer having a thickness greater than or equal to about 25 angstroms and less than or equal to about 3000 angstroms.

30. The display apparatus of claim 1, wherein the metal layer is vacuum deposited.

31. The display apparatus of claim 1, wherein the metal layer is deposited by plating.

32. The display apparatus of claim 1, further comprising a light cavity for providing light to the light modulating layer, adjacent to the prismatic polymer substrate, wherein the metal layer is partially transmissive.

33. The display apparatus of claim 1, wherein the pressure sensitive adhesive layer includes one side having tilted surfaces corresponding to the tilted surfaces of the prismatic structure and a second side being substantially planar.

34. The display apparatus of claim 1, further comprising a cured polymer layer between the metal layer and the pressure sensitive adhesive layer, the cured polymer layer including one side having tilted surfaces corresponding to the tilted surfaces of the prismatic structure and a second side being substantially planar.

35. The display apparatus of claim 1, wherein the pressure sensitive adhesive layer is incorporated into the polarizer.

36. The display apparatus of claim 1, wherein the pressure sensitive adhesive layer is incorporated into the prismatic polymer substrate.

37. A display apparatus of claim 1, wherein the prismatic layer includes tilted surfaces with a tilt angle of about 1° or more and about 35° or less from horizontal.

38. A display apparatus of claim 1, wherein the prismatic layer includes tilted surfaces with a tilt angle of about 3° or more and about 12° or less from horizontal.

39. A display apparatus of claim 1, wherein the prismatic layer includes tilted surfaces with a tilt angle of about 6° or more and about 9° or less from horizontal.

40. A display apparatus of claim 1, wherein the saw-tooth formations have a repeat distance of about 5 microns or more and about 200 microns or less.

41. A display apparatus of claim 1, wherein the saw-tooth formations have a repeat distance of about 30 microns or more and about 80 microns or less.

42. A display apparatus of claim 1, wherein the saw-tooth formations have a repeat distance of about 50 microns.

* * * * *